(12) United States Patent
Missinne et al.

(10) Patent No.: US 10,073,226 B2
(45) Date of Patent: Sep. 11, 2018

(54) METHOD FOR COUPLING AN OPTICAL FIBER TO AN OPTICAL OR OPTOELECTRONIC COMPONENT

(71) Applicant: IMEC VZW, Leuven (BE)

(72) Inventors: Jeroen Missinne, Ghent (BE); Geert Van Steenberger, Sint-Amandsberg (BE)

(73) Assignees: IMEC VZW, Leuven (BE); Universiteit Gent, Ghent (BE)

( * ) Notice: Subject to any disclaimer, the term of this patent is extended or adjusted under 35 U.S.C. 154(b) by 0 days.

(21) Appl. No.: 15/307,695

(22) PCT Filed: May 15, 2015

(86) PCT No.: PCT/EP2015/060809
§ 371 (c)(1),
(2) Date: Oct. 28, 2016

(87) PCT Pub. No.: WO2015/173420
PCT Pub. Date: Nov. 19, 2015

(65) Prior Publication Data
US 2017/0059791 A1    Mar. 2, 2017

(30) Foreign Application Priority Data

May 15, 2014    (EP) .................................... 14168462

(51) Int. Cl.
*G02B 6/10*    (2006.01)
*G02B 6/42*    (2006.01)
(Continued)

(52) U.S. Cl.
CPC ............. *G02B 6/421* (2013.01); *G02B 6/138* (2013.01); *G02B 6/30* (2013.01); *G02B 6/4228* (2013.01); *G02B 6/4239* (2013.01); *G02B 6/4257* (2013.01)

(58) Field of Classification Search
USPC ...................................................... 385/14, 129
See application file for complete search history.

(56) References Cited

U.S. PATENT DOCUMENTS 4,784,452 A * 11/1988 Hodge ................. G02B 6/2852
                                                      359/900
6,231,245 B1 * 5/2001 Buschelberger ..... G02B 6/4212
                                                       385/88
(Continued)

FOREIGN PATENT DOCUMENTS

WO    WO 00/29885 A1    5/2000

*Primary Examiner* — Eric Wong
(74) *Attorney, Agent, or Firm* — Knobbe Martens Olson & Bear, LLP (57) ABSTRACT

A method for optically and mechanically coupling an optical fiber to an optical or optoelectronic component on a substrate is provided. The method comprises: providing an optical fiber comprising a core and a cladding, the core being exposed at an end face of the optical fiber; forming a polymer waveguide core on the end face, the polymer waveguide core extending from the fiber core; bringing the polymer waveguide core in proximity of the optical or optoelectronic component; providing a liquid optical material, the liquid optical material embedding the polymer waveguide core; and curing the liquid optical material, thereby forming a polymer cladding layer encapsulating the polymer waveguide core and mechanically attaching the optical fiber to the optical or optoelectronic component.

13 Claims, 4 Drawing Sheets

(51) Int. Cl.
*G02B 6/30* (2006.01)
*G02B 6/138* (2006.01)

(56) References Cited

U.S. PATENT DOCUMENTS

| | | | |
|---|---|---|---|
| 7,251,398 B2 * | 7/2007 | Baets | G02B 6/4201 |
| | | | 385/15 |
| 2004/0165839 A1 | 8/2004 | Zohrabyan et al. | |
| 2005/0058420 A1 * | 3/2005 | Inui | B29D 11/00663 |
| | | | 385/129 |
| 2005/0158001 A1 * | 7/2005 | Fabian | C03C 25/106 |
| | | | 385/128 |
| 2010/0001421 A1 | 1/2010 | Yonemura et al. | |
| 2010/0061684 A1 | 3/2010 | Terada et al. | |
| 2010/0111136 A1 * | 5/2010 | Huang | G01D 5/35303 |
| | | | 374/161 |
| 2013/0266255 A1 | 10/2013 | Tan et al. | |

* cited by examiner

METHOD FOR COUPLING AN OPTICAL FIBER TO AN OPTICAL OR OPTOELECTRONIC COMPONENT

INCORPORATION BY REFERENCE TO RELATED APPLICATIONS

Any and all priority claims identified in the Application Data Sheet, or any correction thereto, are hereby incorporated by reference under 37 CFR 1.57. This application is the national phase under 35 U.S.C. § 371 of prior PCT International Application No. PCT/EP2015/060809 which has an International Filing Date of May 15, 2015, which designates the United States of America, and which claims priority to European Application No. 14168462.1 filed May 15, 2014. Each of the aforementioned applications is incorporated by reference herein in its entirety, and each is hereby expressly made a part of this specification.

FIELD

The present disclosure is related to methods for optically and mechanically coupling an optical fiber to an optical component or to an optoelectronic component.

STATE OF THE ART

In high-speed telecom applications the use of VCSELs (Vertical-Cavity Surface-Emitting Lasers) is still limited. This is related to the lack of a good method for direct coupling of optical fibers to such components. Since the output power of VCSELs is limited, an efficient coupling between the VCSEL and the optical fiber is required in order to obtain a sufficiently high optical link power budget.

For high-frequency operation, flip-chip mounting (face-down mounting) of the VCSEL on a board or substrate is preferred because this approach allows minimizing the electrical interconnection lengths between the VCSEL and a driver circuit. However, for most VCSELs, laser light is emitted at the side where the bond pads are located, and therefore fiber access to the emitting area is blocked by the substrate when the VCSEL is flip-chip mounted.

The alternative approach, using face-up mounting and wire bonding of the VCSEL, is less favorable for RF signals as it increases the electrical interconnection length. Additionally, the presence of wire bonds may hinder or block the fiber from accessing the emitting area of the VCSEL. This increases the coupling distance between the emitting window and the fiber substantially, requiring the use of lenses for collimating the VCSEL light into the fiber.

Also direct coupling of optical fibers to on-board waveguides may be challenging, because providing a waveguide end-face of sufficient optical quality may be difficult, and because of the need for matching of the mode field diameter of the fiber and the on-board waveguide. In addition, the mechanical stability of the fiber-waveguide assembly may be unsatisfactory.

SUMMARY

The present disclosure aims to provide methods for optically and mechanically coupling an optical fiber, e.g. a single mode optical fiber, to an optoelectronic component such as a VCSEL or to an optical component such as an on-board waveguide, e.g. single mode on-board waveguide, with good coupling efficiency and with good mechanical stability.

The disclosure is related to a method for optically and mechanically coupling an optical fiber to an optical or optoelectronic component on a substrate, the method comprising: providing an optical fiber comprising a core and a cladding, the core being exposed at an end face of the optical fiber; forming a polymer waveguide core on the end face, the polymer waveguide core extending from the fiber core; bringing the polymer waveguide core in proximity of the optical or optoelectronic component; providing a liquid optical material, the liquid optical material embedding the polymer waveguide core; and curing the liquid optical material, thereby forming a polymer cladding layer encapsulating the polymer waveguide core and mechanically attaching the optical fiber to the optical or optoelectronic component.

In embodiments of the present disclosure, providing the liquid optical material may comprise providing the liquid optical material in physical contact with the optical or optoelectronic component.

In embodiments of the present disclosure the optical fiber may be a single mode optical fiber. It may for example be a single mode optical fiber suitable for telecom wavelengths (such as e.g. 1550 nm), for example an SMF-28 fiber. Alternatively, it may be a single mode optical fiber suitable for another wavelength or wavelength range, such as e.g. 780 nm or 650 nm, the present disclosure not being limited thereto.

In preferred embodiments of the present disclosure, the liquid optical material is provided such that it is fully embedding the polymer waveguide core. It is an advantage of fully embedding the polymer waveguide core that a good coupling efficiency between the optical fiber and the optical or optoelectronic component can be obtained.

In embodiments of the present disclosure the substrate may for example be a printed circuit board or a printed wiring board. In embodiments of the present disclosure the substrate may for example be an interposer or a sub-mount, such as e.g. a ceramic sub-mount, or an integrated circuit, the present disclosure not being limited thereto.

In embodiments of the present disclosure the optoelectronic component may for example be a light source such as a laser, e.g. a VCSEL (Vertical-Cavity Surface-Emitting Laser), or a photodetector, the present disclosure not being limited thereto.

In embodiments of the present disclosure, bringing the polymer waveguide core in proximity of the optoelectronic or optical component may comprise bringing the polymer waveguide core at a predetermined distance from the optoelectronic or optical component. The predetermined distance may for example in the range between 0 micrometer and 30 micrometer, e.g. between 0 micrometer and 10 micrometer, e.g. between 3 micrometer and 10 micrometer.

In embodiments of the present disclosure, bringing the polymer waveguide core in proximity of the optoelectronic or optical component may comprise bringing the polymer waveguide core in physical contact with the optoelectronic or optical component. The latter can advantageously be done in a more accurate way, since the diameter of the polymer waveguide core is substantially smaller than the diameter of the optical fiber.

The method of the present disclosure may further comprise, after bringing the polymer waveguide core in proximity of the optoelectronic component, aligning the polymer waveguide core with an optical input window or an optical output window of the optoelectronic component.

The optoelectronic component may be flip-chip mounted on the substrate, and the optical fiber may be coupled to the optoelectronic component through an opening in the substrate. It is an advantage of embodiments of the present disclosure that such coupling can be done through an opening in the substrate that is smaller than a diameter of the optical fiber, due to the presence of the intermediate polymer waveguide core, which has a diameter that is substantially smaller than the diameter of the optical fiber.

The optoelectronic component may be wire bonded to the substrate. It is an advantage of embodiments of the present disclosure that, due to the presence of the intermediate polymer waveguide core, hindering or blocking by the wire bonds is avoided and a good reachability of the optoelectronic component is obtained.

In embodiments of the present disclosure the optical component may for example be a waveguide, e.g. a planar or a non-planar waveguide integrated on a substrate, such as for example a slab waveguide, a rib waveguide or a channel waveguide, e.g. single mode waveguide, the present disclosure not being limited thereto.

In embodiments of the present disclosure the optical coupling may comprise butt coupling. In other embodiments of the present disclosure the optical coupling may comprise evanescent coupling, or adiabatic coupling.

In embodiments of the present disclosure, forming the polymer waveguide core on the end face may comprise forming a light-induced Self Witten Waveguide (LISW or SWW) polymer waveguide core on the end face.

In embodiments of the present disclosure the liquid optical material may be a material or a mixture of materials that is light sensitive, e.g. sensitive to UV light, and that may be cured (polymerized) by light exposure, e.g. UV light exposure.

In embodiments of the present disclosure the liquid optical material may be a material or a mixture of materials that is temperature sensitive, and that may be cured (polymerized) by heating.

After curing, the optical material preferably has a refractive index that is lower than the refractive index of the polymer core material. The refractive index of the optical material is preferably selected to be suitable to be used as a cladding material for the polymer waveguide core. For example, the refractive index of the optical material after curing may be about 0.005 lower than the refractive index of the polymer waveguide core, the present disclosure not being limited thereto.

In embodiments of the present disclosure, providing the liquid optical material may comprise providing the liquid optical material by dispensing or by printing.

It is an advantage of embodiments of the present disclosure that the optical material provided for forming a cladding for the polymer waveguide core, also provides good mechanical attachment of the optical fiber.

A method of the present disclosure may also be used for optically and mechanically coupling an array of optical fibers to an array of optical or optoelectronic components on a substrate.

The present invention also relates to an optical system comprising an optical fiber comprising a core and a cladding, the core being exposed at an end face of the optical fiber, an optical or optoelectronic component on a substrate; a polymer waveguide core formed on the end face of the optical fiber thus extending from the fiber core and being positioned in the vicinity of the optical or optoelectronic component, and a polymer cladding layer encapsulating the polymer waveguide core and mechanically attaching the optical fiber to the optical or optoelectronic component.

The polymer waveguide core may be a self-written polymer waveguide core.

The optical or optoelectronic component may be a single mode waveguide.

The optical or optoelectronic component may be flip-chip mounted on the substrate and the optical fiber may be coupled to the optical or optoelectronic component via the polymer waveguide core extending through an opening in the substrate. It is an advantage that only a small opening in the substrate may be sufficient while still allowing good coupling.

The optical or optoelectronic component may be mounted face-up on the substrate and may be wire bonded to the substrate. The polymer waveguide core may be such that the optical fiber is not hindered by the wire bonds.

Certain objects and advantages of various inventive aspects have been described herein above. Of course, it is to be understood that not necessarily all such objects or advantages may be achieved in accordance with a particular embodiment of the disclosure. Thus, for example, those skilled in the art will recognize that the disclosure may be embodied or carried out in a manner that achieves or optimizes one advantage or group of advantages as taught herein without necessarily achieving other objects or advantages as may be taught or suggested herein. Further, it is understood that this summary is merely an example and is not intended to limit the scope of the disclosure. The disclosure, both as to organization and method of operation, together with features and advantages thereof, may best be understood by reference to the following detailed description when read in conjunction with the accompanying drawings.

Any reference signs in the claims shall not be construed as limiting the scope of the present disclosure.

In the different drawings, the same reference signs refer to the same or analogous elements.

DETAILED DESCRIPTION

In the following detailed description, numerous specific details are set forth in order to provide a thorough understanding of the disclosure and how it may be practiced in particular embodiments. However, it will be understood that the present disclosure may be practiced without these specific details. In other instances, well-known methods, procedures and techniques have not been described in detail, so as not to obscure the present disclosure.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein. Moreover, the terms top, over and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

The present disclosure provides a method for optically and mechanically coupling an optical fiber, such as a single mode optical fiber, to an optoelectronic component, such as for example a VCSEL or a photodetector, or to an optical component, such as for example a planar or a non-planar waveguide on a substrate. The method of embodiments of the present disclosure can also be used for coupling an array of optical fibers to an array of optoelectronic components or to an array of optical components.

A method of the present disclosure comprises: providing an optical fiber, such as a single mode optical fiber, the optical fiber comprising a core and a cladding, the core being exposed at an end face of the optical fiber; forming a polymer waveguide core on the end face, the polymer waveguide core extending from the fiber core at the end face; bringing the polymer waveguide core in proximity of the optical or optoelectronic component; providing a liquid optical material preferably in contact with the optical or optoelectronic component, the liquid optical material embedding the polymer waveguide core; and curing the liquid optical material, thereby forming a polymer cladding layer encapsulating the polymer waveguide core and mechanically attaching the optical fiber to the optical or optoelectronic component.

The method of the present disclosure may further comprise, after bringing the polymer waveguide core in proximity of the optoelectronic component, aligning a facet of the polymer waveguide core with an optical input window or an optical output window of the optoelectronic component. In embodiments of the present disclosure, forming the polymer waveguide core on the end face may comprise forming a light-induced Self Written Waveguide or Self Written Waveguide (LISW or SWW) polymer waveguide core on the end face. This may for example comprise immersing the end face or fiber tip in a liquid UV curable polymer material and subsequently sending UV light through the fiber, thereby locally curing (polymerizing) the UV curable material and forming the polymer waveguide core. It is an advantage of this approach that a very good alignment is obtained between the fiber core and the self-written polymer waveguide core. After UV curing the non-polymerized material may be removed, e.g. using acetone or a dedicated developer.

A method of the present disclosure may advantageously be used for coupling a single mode optical fiber to an optoelectronic component such as a VCSEL, wherein the VCSEL may be mounted face-up (e.g. wire bonded) or face-down (flip-chip mounted) on a substrate or carrier. Process steps of a method according to an embodiment of the present disclosure, as may be used for coupling an optical fiber to a VCSEL, are schematically shown in FIG. 1. FIG. 1(*a*) shows a flow chart of the method; FIGS. 1(*b*) to 1(*e*) schematically show the resulting structure at different stages of the method. At step 1, an optical fiber 30 comprising a core 301 and a cladding 302 is provided, wherein the core 301 is exposed at an end face of the optical fiber (FIG. 1(*b*)). Step 2 comprises forming a polymer waveguide core 31 on the end face of the optical fiber 30, the polymer waveguide core 31 extending from the fiber core 301 at the end face (FIG. 1(*c*)). This may for example be done by immersing the fiber tip in a drop of UV curable polymer material and subsequently sending UV light through the fiber. Afterwards, the non-polymerized material may be removed using acetone. In a next step 3 the fiber 30 with the polymer waveguide core 31 (fiber-SWW assembly) is positioned with its end at a distance, e.g. predetermined distance, from the VCSEL 20 and aligned to the optical output window 21 of the VCSEL (FIG. 1(*d*)). In an initial alignment step, a first (rough) alignment may be performed using a vision system; in a further alignment step a second, more precise, alignment may be obtained using an active alignment method wherein the VCSEL 20 is operated under a constant current and probed and wherein the fiber 30 is connected to a power meter and detects the light emitted by the VCSEL. After alignment, at step 4, a liquid optical material 40 (cladding material) is provided, e.g. dispensed. The liquid optical material is preferably provided such that it contacts the VCSEL 20 and such that it is embedding the polymer waveguide core 31. At this stage a final precision active alignment may be performed if needed. Next (step 5) the liquid optical material 40 is cured (polymerized), e.g. by means of an UV flood exposure, thereby forming a polymer cladding layer encapsulating the polymer waveguide core and mechanically attaching the optical fiber to the VCSEL (FIG. 1(*e*)).

Figure 1A:
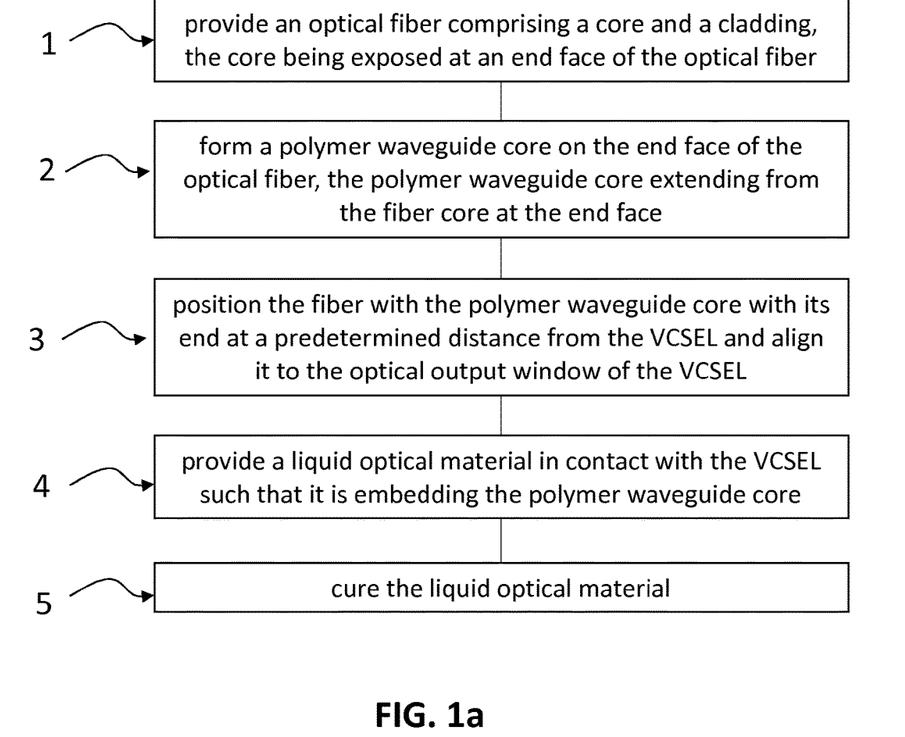
FIG. 1(a) and FIGS. 1(b) to 1(e) illustrate process steps of a method according to an embodiment of the present disclosure.
Figure 1B:
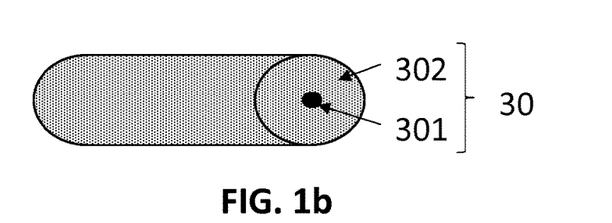
Figure 1C:
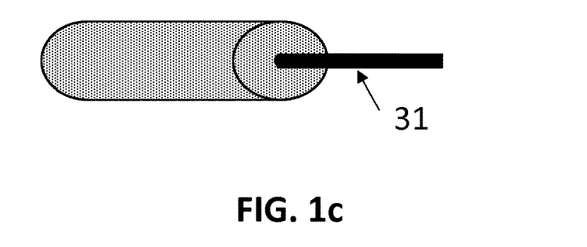
Figure 1D:
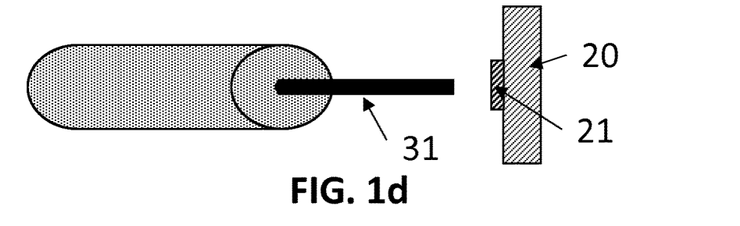
Figure 1E:
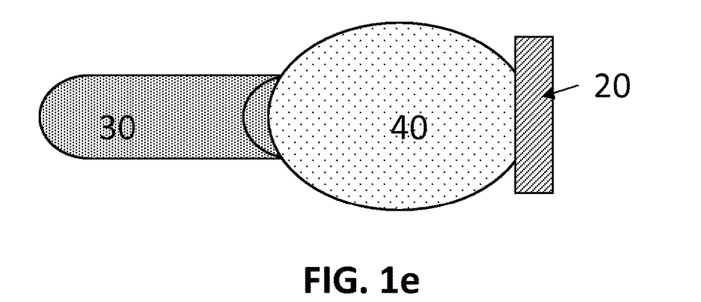
Figure 2:
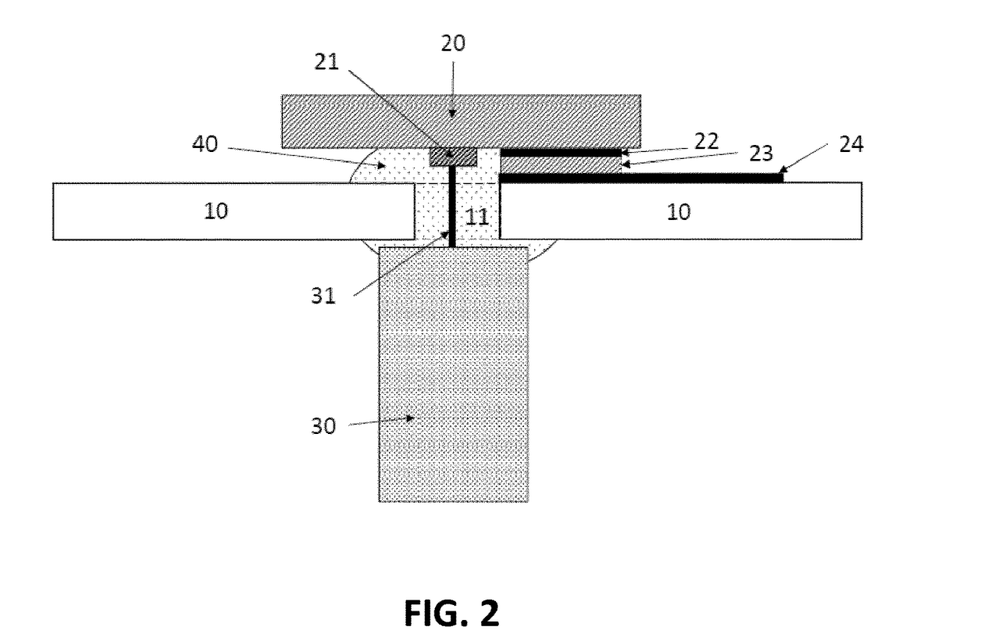
FIG. 2 shows an optical fiber coupled to a VCSEL that is flip-chip mounted on a substrate, in accordance with a method according to an embodiment of the present disclosure.
Figure 3:
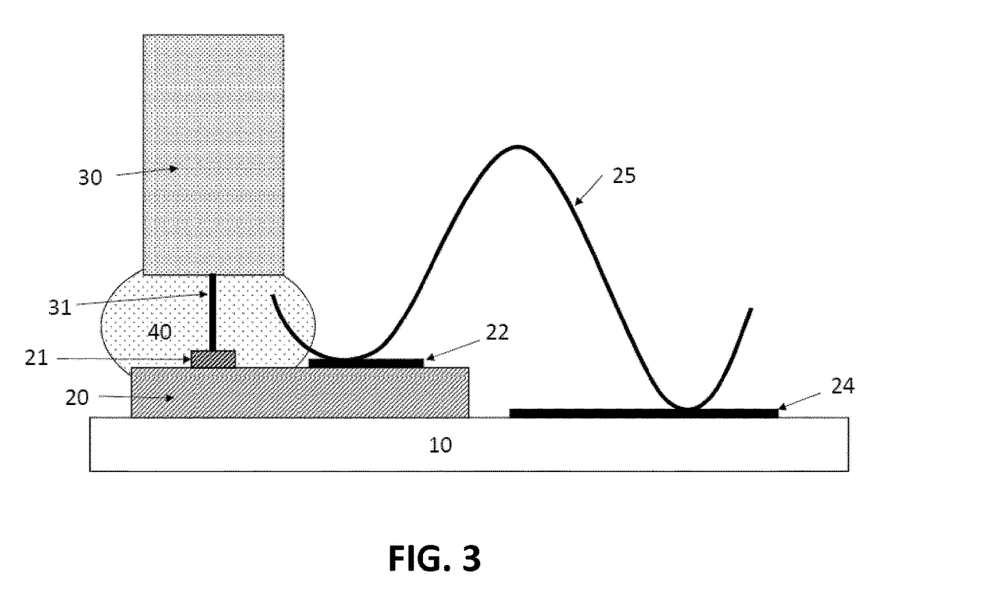
FIG. 3 shows an optical fiber coupled to a VCSEL that is wire bonded to a substrate, in accordance with a method according to an embodiment of the present disclosure.

The resulting structure is schematically illustrated in FIG. 2 for a flip chip mounted VCSEL and in FIG. 3 for a wire bonded VCSEL.

FIG. 2 shows a VCSEL 20 that is flip chip mounted on a substrate 10, at a first side of the substrate 10. The optical window (emitting area) 21 of the VCSEL 20 is oriented towards the substrate 10. A bond pad 22 of the VCSEL 20 is electrically connected to a metal line 24 on the substrate 10 by means of an electrically conductive connection 23. An optical fiber 30 is positioned at a second side of the substrate 10 opposite to the first side. A polymer waveguide core 31 extends from a facet of the optical fiber 30 and forms an optical coupling structure between the optical fiber 30 and the optical window 21 of the VCSEL 20, through an opening 11 in the substrate 10. Optical material 40 (shown transparent in FIG. 2 for illustrative purposes only) provides a cladding for the polymer waveguide core 31 and mechanically attaches the optical fiber with the waveguide core to the VCSEL 20 and substrate 10.

The diameter of the SWW polymer waveguide core 31 is much smaller than the diameter of the optical fiber 30, because it only extends from the core of the optical fiber. The diameter of the polymer waveguide core 31 is typically in the range between 5 micrometer and 10 micrometer, whereas the diameter of the optical fiber 30 is typically in the order of 125 micrometer. Because of the small diameter of the polymer waveguide core 31, it can be inserted through a relatively small hole or opening 11 in the substrate 10 on which the VCSEL 20 is flip chip mounted. The diameter of the opening 11 in the substrate 10 may for example be in the range between 50 micrometer and 100 micrometer.

FIG. 3 shows a VCSEL 20 that is wire bonded to a substrate 10 at a first side of the substrate 10. The optical window (emitting area) 21 of the VCSEL 20 is oriented away from the substrate 10. A bond pad 22 of the VCSEL 20 is electrically connected to a metal line 24 on the substrate 10 by means of an electrically conductive wire bond connection 25. An optical fiber 30 is positioned at the first side of the substrate 10. A polymer waveguide core 31 extends from a facet of the optical fiber 30 and forms an optical coupling structure between the optical fiber 30 and the optical window 21 of the VCSEL 20. In this configuration, the wire bond 25 is present in a region at the emitting side of the VCSEL 20, and it may block access to the optical window 21 of the VCSEL for an optical fiber 30. It is an advantage of providing a thin polymer waveguide core 31 extending from the optical fiber facet, that accessibility of the optical window 21 of the VCSEL 20 is substantially improved. Optical material 40 (shown transparent in FIG. 3 for illustrative purposes only) provides a cladding for the polymer waveguide core 31 and mechanically attaches the optical fiber with the waveguide core to the VCSEL 20.

In embodiments of the present disclosure, forming the polymer waveguide core 31 may comprise: positioning the optical fiber 30 at a distance, e.g. predetermined distance, from an optically flat surface which is coated with a release layer; forming the polymer waveguide core by means of a SWW method; and separating the fiber with the SWW waveguide core from the optically flat surface. The predetermined distance corresponds to the length of the polymer waveguide core to be formed. The SWW method may comprise immersing the optical fiber and the optically flat surface in a curable resin, e.g. UV curable resin, and sending UV light through the optical fiber, thereby initiating polymerization of the resin. Since polymerization of the resin causes its refractive index to increase, the polymer structure initiated at the fiber facet forms a progressively growing 'self-written' waveguide core. After the curing process, uncured material is removed. In embodiments of the present disclosure, the optically flat surface may for example be a facet of another optical fiber, the present disclosure not being limited thereto. The release layer may for example be a PDMS (Poly DiMethyl Siloxane) layer, the present disclosure not being limited thereto. In an advantageous embodiment a flat PDMS layer may be used simultaneously to provide the optically flat surface and the release layer.

It is an advantage of a method of the present disclosure that the self-written polymer waveguide core is perfectly aligned with the optical fiber core, and it only needs to be aligned with the active area (optical input window or output window) of the optoelectronic component.

It is an advantage of a method of the present disclosure that it allows overcoming VCSEL-to-fiber coupling issues of existing approaches. Using a method of the present disclosure, good coupling efficiencies may be obtained.

In a method according to the present disclosure, after forming the polymer waveguide core on the fiber facet, the optical fiber with the polymer core attached to it is aligned to the active area of the optoelectronic component. This may for example be done using an active alignment procedure. Depending on the distance to be bridged between the polymer waveguide core and the optoelectronic component, the length of the polymer waveguide core may for example be in the range between 20 micrometer and 200 micrometer, the present disclosure not being limited thereto.

The length of the polymer waveguide, e.g. SWW, advantageously may be selected such that it positively influences the mechanical stability of the structure. It may be selected short, e.g. as short as possible, but sufficiently long to allow good coupling. For example, the length of the polymer waveguide may be selected such that there is no interference with the wirebond(s) sticking out.

It is an advantage of embodiments of the present invention that a short length can be chosen for the polymer waveguide, e.g. SWW, as this allows high tolerances with respect to the refractive index contrast of the core and the cladding. A deviation in this refractive index contrast can result from less accurate mixing of the required materials, but also from aging effects. It may happen that the ore and the cladding experience a slightly different ageing effect, therefore resulting in changes in index contrast over time. Another effect on deviation on the refactive indices may be caused by the temperature, giving rise to changes in index contrast. After the alignment step, another material 40, with a precisely controlled refractive index (e.g. 0.005 lower than the refractive index of the polymer core material) suitable to be used as a cladding material for the polymer waveguide core is provided such that it is surrounding the polymer waveguide core. i.e. at least embedding the lateral surfaces of the polymer core. The optical material may optionally also be present in the gap between the face of the polymer waveguide core and the optoelectronic component.

This optical cladding material is preferably provided as a liquid, for example by dispensing. Afterwards the liquid cladding material is cured, for example using flood UV exposure, thereby forming a polymer cladding and at the same time mechanically stabilizing the connection between the polymer waveguide core and the optoelectronic component. After curing, the optical material forms a cladding layer embedding the polymer waveguide core. The cladding layer may for example have a thickness in the range of a few micrometer. Optionally, afterwards an adhesive material such as for example an epoxy material may be provided to reinforce the mechanical connection.

The materials used may be selected so as to obtain refractive indices (RI) in the assembly such that good coupling can be obtained. The refractive indices of the materials used are relevant parameters in case of an adiabatic coupling approach between a SWW and an on-board channel/slab waveguide. The materials may be selected such that the refractive indices comply with one or more of the following rules:

the refractive index of the on-board waveguide cladding is lower than the refractive index of the waveguide core, the refractive index of the cladding for the polymer waveguide, e.g. SWW, is lower than the refractive index of the polymer waveguide core, e.g. SWW core.

the refractive index of the cladding of the polymer waveguide, e.g. SWW, is lower than the refractive index of the on-board waveguide core, such that the power transfer from the polymer waveguide into the on-board waveguide and since the polymer waveguide cladding acts as partial cladding for the waveguide core.

In embodiments of the present disclosure, the optical fiber with the polymer waveguide core may be mounted perpendicular to the optoelectronic component, as illustrated in FIG. 2 and FIG. 3, or it may be mounted non-perpendicular to the optoelectronic component.

A method of the present disclosure may also be used for coupling an optical fiber to another type of optoelectronic component, such as for example a photodetector.

A method of the present disclosure may also advantageously be used for coupling an optical fiber, for example a single mode optical fiber, to a waveguide provided on a substrate or an on-board waveguide, for example a single mode waveguide. In embodiments of the present disclosure the waveguide may be a slab waveguide. In other embodiments of the present disclosure the waveguide may be a channel waveguide.

Slab waveguides or planar waveguides may for example be used in biosensors, to excite labels with an optical field over a predetermined area. For such applications, single mode waveguides are preferred because of their well-defined properties. These single mode waveguides typically have a small core thickness (typically 2 micrometer or less). This makes it difficult to couple light from an optical fiber directly to the waveguide, because a typical spot size of light emitted by an optical fiber is in the range between 5 micrometer and 10 micrometer.

By using a method according to the present disclosure, a self-written polymer waveguide is used as an intermediate waveguide between the optical fiber and the on-board waveguide. The method is schematically illustrated in FIG. 4. It comprises: providing an optical fiber 30, for example a single mode optical fiber, the optical fiber comprising a core 301 and a cladding 302, the core 301 being exposed at an end facet of the optical fiber (FIG. 4(a)); forming a polymer waveguide core 31 on the end face, the polymer waveguide core 31 extending from the fiber core 301 at the end face (FIG. 4(b)); bringing the polymer waveguide core 31 in proximity of the slab waveguide 50 provided on a substrate 10 (FIG. 4(c)), e.g. in physical contact with the slab waveguide; providing a liquid optical material 40 in contact with the slab waveguide 50 and embedding the polymer waveguide core 31 (FIG. 4(d)); and curing the liquid optical material, thereby forming a polymer cladding layer encapsulating the polymer waveguide core and mechanically attaching the optical fiber to the slab waveguide.

The length of the self-written polymer waveguide core 31 may be optimized based on simulations. For example, in order to be able to comfortably bring the polymer waveguide core in contact with the slab waveguide, the length of the polymer waveguide core may be larger than 30 micrometer, e.g. larger than 50 micrometer.

Figure 4A:
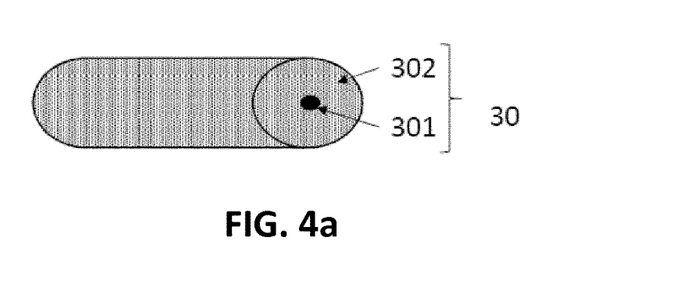
FIGS. 4(a) to 4(d) schematically illustrate a method according to an embodiment of the present disclosure, for evanescent coupling of an optical fiber to a slab waveguide on a substrate.
Figure 4B:
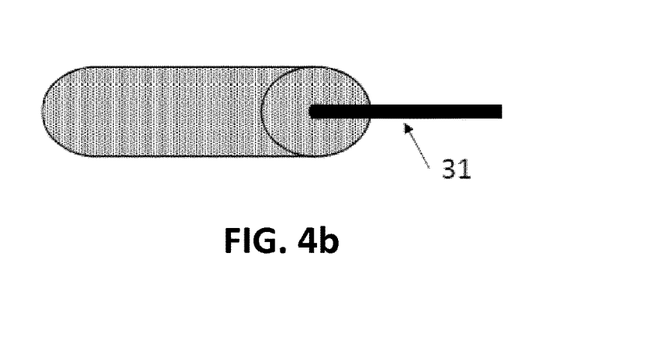
Figure 4C:
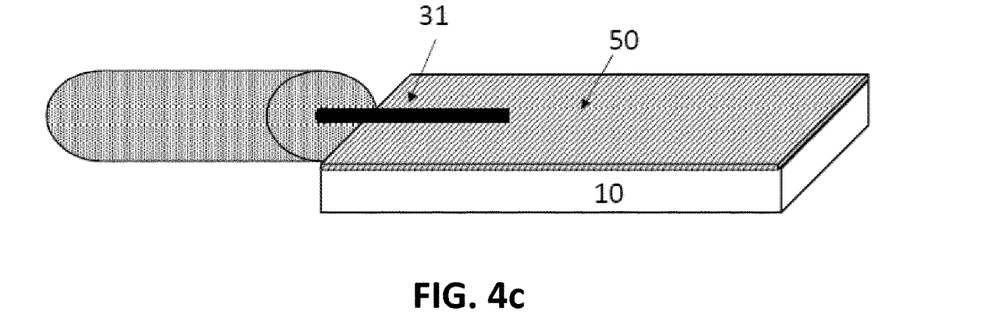
Figure 4D:
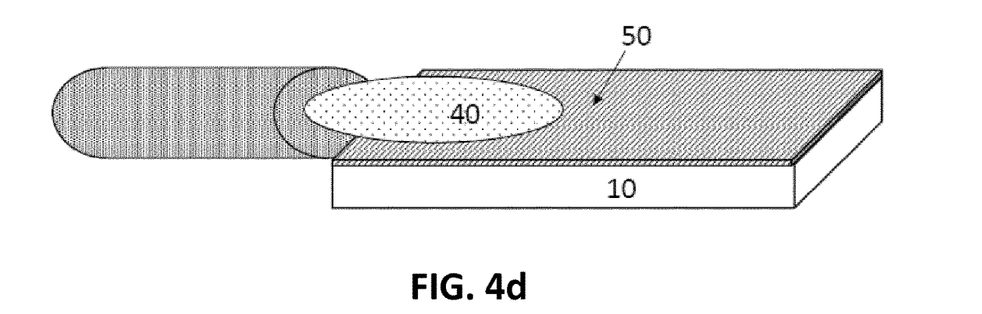

Bringing the self-written polymer waveguide core in physical contact with the slab waveguide enables evanescent coupling or adiabatic coupling of light between the polymer waveguide core 31 and the slab waveguide 50. The amount of overlap between the polymer waveguide core and the slab waveguide may be determined or optimized through simulations. For example, the overlap may be in the range between 50 micrometer and 150 micrometer, the present disclosure not being limited thereto.

As an alternative to bringing the self-written polymer waveguide core in physical contact with the slab waveguide, it may also be provided at a small distance from the slab waveguide surface, e.g. at a distance smaller than 1 micrometer from the slab waveguide surface.

This method may also be used similarly for evanescent or adiabatic coupling with an on-board channel waveguide instead of an on-board slab waveguide.

In an alternative approach, a method of the present disclosure may be used for edge coupling of an optical fiber with an on-board channel waveguide or with an on-board slab waveguide, as an alternative to evanescent or adiabatic coupling.

Figure 5A:
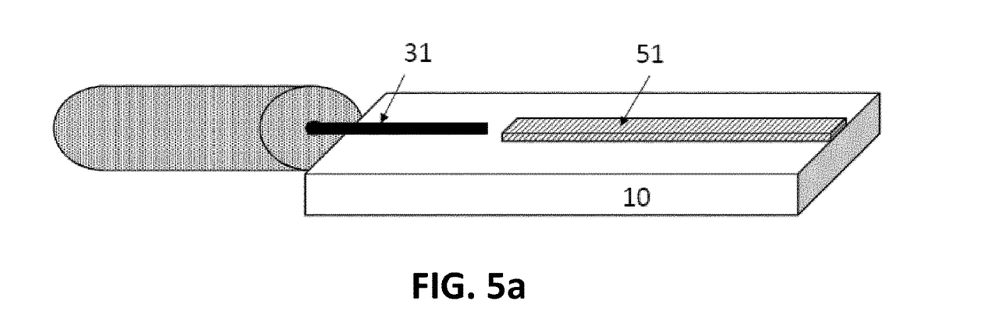
FIGS. 5(a) and 5(b) schematically illustrate a method according to an embodiment of the present disclosure, for butt coupling of an optical fiber to a channel waveguide on a substrate.
Figure 5B:
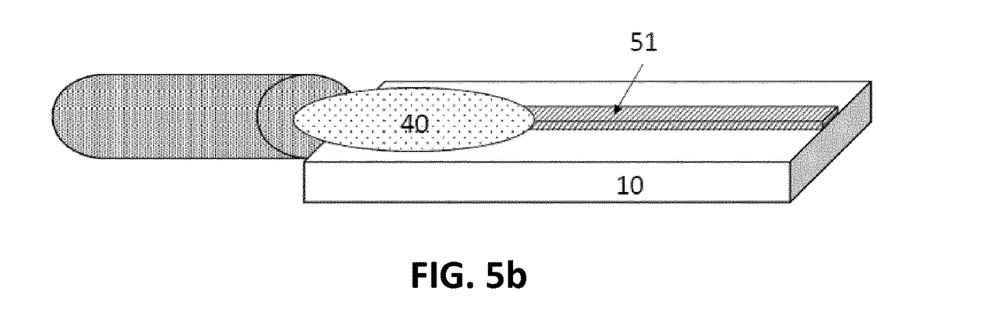

Using a method of the present disclosure, optical coupling between an optical fiber and an on-board channel waveguide may comprise: providing an optical fiber 30, such as a single mode optical fiber, the optical fiber comprising a core 301 and a cladding 302, the core 301 being exposed at an end face of the optical fiber 30; forming a polymer waveguide core 31 on the end face, the polymer waveguide core extending from the fiber core 301 at the end face; bringing the polymer waveguide core 31 in proximity of an end face of the channel waveguide 51, e.g. at a predetermined distance from an end face of the channel waveguide 51 (as illustrated in FIG. 5(a)); providing a liquid optical material 40 embedding the polymer waveguide core 31 (FIG. 5(b)); and curing the liquid optical material 40, thereby forming a polymer cladding layer encapsulating the polymer waveguide core and mechanically attaching the optical fiber to the channel waveguide. Preferably the end face of the channel waveguide 51 is provided at a distance from an edge of the board or substrate 10 on which the channel waveguide is provided. The self-written polymer waveguide core 31 may be mechanically attached to the substrate 10 by the cladding material.

Preferably there is a good optical mode matching between the self-written polymer waveguide core and the on-board channel waveguide. This may for example be realized by providing taper structures, e.g. polymer taper structures, on top of the channel waveguide.

As compared to known methods for optical coupling between an optical fiber and an on-board channel waveguide, it is an advantage of the method in accordance with the present disclosure that an automatic alignment in a direction perpendicular to the substrate surface may be obtained by bringing the polymer waveguide core in physical contact with the substrate.

Experiments were done wherein a single mode optical fiber with a 9 micrometer core diameter was optically coupled to a single mode polymer slab waveguide with a thickness in the range between 1.5 micrometer and 2 micrometer.

A freestanding self-written waveguide core extending from the facet of the optical fiber was fabricated first. This was achieved by positioning the fiber facet at a distance of 100 micrometer from a flat PDMS layer surface, to define the length of the self-written waveguide core, then dispensing a drop of UV curable polymerization mixture (a mixture of 35 w % OrmoCore and 65 w % OrmoClad) in the gap between the fiber facet and the flat surface, and then sending UV light through the fiber to create the self-written waveguide core. The adhesion of the polymer to the flat PDMS surface is considerably less than to the fiber, thus enabling an easy release of the SWW while keeping it attached to the fiber facet. To remove the uncured polymer, the fiber-SWW assembly was dipped in acetone for about 1 second.

The prefabricated fiber-SWW assembly was then aligned in front of the edge of the thin slab waveguide. First the fiber-SWW assembly was positioned in front of the end-face of the slab waveguide and aligned with the slab, using cameras. Then the fiber-SWW assembly was lifted up by tens of microns and shifted, thereby positioning it above and past the edge of the slab waveguide. For a 100 micrometer long SWW, the typical overlap between the SWW and the slab waveguide was about 75 micrometer. Subsequently, the fiber-SWW was lowered until the SWW contacted the core of the slab waveguide.

Another polymer was then dispensed over the SWW to form the cladding. This material was cured using a flood UV exposure. It serves both as the cladding and the adhesive to join the fiber to the slab waveguide.

The foregoing description details certain embodiments of the disclosure. It will be appreciated, however, that no matter how detailed the foregoing appears in text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the invention.

In a particular example, wherein the above described technique for making a coupling was performed, a structure was obtained for a single mode fiber—self written waveguide—fiber transition wherein the effective total insertion loss at 1550 nm was below 0.3 dB.

In one aspect, the present invention also relates to an optical system comprising an optical fiber comprising a core and a cladding, the core being exposed at an end face of the optical fiber, an optical or optoelectronic component on a substrate; a polymer waveguide core formed on the end face of the optical fiber thus extending from the fiber core and being positioned in the vicinity of the optical or optoelectronic component, and a polymer cladding layer encapsulating the polymer waveguide core and mechanically attaching the optical fiber to the optical or optoelectronic component. Such a system may be advantageously obtained using a method according to embodiments of the first aspect, described above. Furthermore, additional structural features may be as described above when describing the method of coupling a fiber to an optical or optoelectronic device. Some examples are the polymer waveguide core being a self-written polymer waveguide core, the optical or optoelectronic component being a single mode waveguide, the optical or optoelectronic component being flip-chip mounted on the substrate and the optical fiber being coupled to the optical or optoelectronic component via the polymer waveguide core extending through an opening in the substrate, etc.

The invention claimed is:

1. A method for optically and mechanically coupling an optical fiber to an optical or optoelectronic component on a substrate, the method comprising:
   providing an optical fiber comprising a core and a cladding, the core being exposed at an end face of the optical fiber;
   forming a light-induced self-written polymer waveguide core on the end face, the light-induced self-written polymer waveguide core extending from the fiber core;
   bringing the light-induced self-written polymer waveguide core in proximity of an optical or optoelectronic component;
   providing a liquid optical material, the liquid optical material embedding the light-induced self-written polymer waveguide core; and
   curing the liquid optical material, thereby forming a polymer cladding layer encapsulating the light-induced self-written polymer waveguide core and mechanically attaching the optical fiber to the optical or optoelectronic component.

2. The method according to claim 1, wherein the liquid optical material is fully embedding the polymer waveguide core.

3. The method according to claim 1, wherein the optical fiber is a single mode optical fiber.

4. The method according to claim 1, wherein the optical or optoelectronic component is a light source.

5. The method according to claim 4, wherein the light source is a Vertical-Cavity Surface-Emitting laser.

6. The method according to claim 1, wherein the optical or optoelectronic component is a photodetector.

7. The method according to claim 1, further comprising, after bringing the polymer waveguide core in proximity of the optical or optoelectronic component, aligning the polymer waveguide core with an optical window of the optical or optoelectronic component.

8. The method according to claim 1, wherein the optical or optoelectronic component is flip-chip mounted on the substrate and wherein the optical fiber is coupled to the optical or optoelectronic component through an opening in the substrate.

9. The method according to claim 1, wherein the optical or optoelectronic component is mounted face-up on the substrate.

10. The method according to claim 9, wherein the optical or optoelectronic component is wire bonded to the substrate.

11. The method according to claim 1, wherein the optical or optoelectronic component is a waveguide.

12. The method according to claim 11, wherein the waveguide is a single-mode waveguide.

13. A method for optically and mechanically coupling an optical fiber to an optical or optoelectronic component on a substrate, the method comprising:
   providing a single mode optical fiber comprising a core and a cladding, the core being exposed at an end face of the optical fiber;
   forming a self-written polymer waveguide core on the end face, the self-written polymer waveguide core extending from the fiber core;
   bringing the self-written polymer waveguide core in proximity of a vertical-cavity surface-emitting laser;
   aligning the self-written polymer waveguide core with an optical window of the vertical-cavity surface-emitting laser by using a vision system for a first alignment; thereafter
   aligning the self-written polymer waveguide core with an optical window of the vertical-cavity surface-emitting laser by using an active alignment for a second alignment, wherein the vertical-cavity surface-emitting laser is operated under a constant current and probed and wherein the single mode optical fiber is connected to a power meter and detects light emitted by the vertical-cavity surface-emitting laser;

providing a liquid optical material, the liquid optical material embedding the self-written polymer waveguide core; and curing the liquid optical material, thereby forming a polymer cladding layer encapsulating the self-written polymer waveguide core and mechanically attaching the single mode optical fiber to the vertical-cavity surface-emitting laser.

* * * * *

UNITED STATES PATENT AND TRADEMARK OFFICE
CERTIFICATE OF CORRECTION

PATENT NO. : 10,073,226 B2
APPLICATION NO. : 15/307695
DATED : September 11, 2018
INVENTOR(S) : Jeroen Missinne Page 1 of 1

It is certified that error appears in the above-identified patent and that said Letters Patent is hereby corrected as shown below:

On the Title Page

Item (72), (Inventors) at Line 2, Change "Steenberger," to --Steenberge,--.

Signed and Sealed this
Fifth Day of March, 2019

Andrei Iancu
*Director of the United States Patent and Trademark Office*